United States Patent
Kim et al.

(10) Patent No.: US 8,031,427 B2
(45) Date of Patent: Oct. 4, 2011

(54) METHOD OF SERVO WRITING, METHOD OF COMPENSATING PHASE MISMATCH OF SERVO PATTERN AND HARD DISK DRIVE ON WHICH THE METHODS ARE IMPLEMENTED

(75) Inventors: Yong-su Kim, Seoul (KR); Jae-chul Shim, Yongin-si (KR); Cheol-soon Kim, Anyang-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 46 days.

(21) Appl. No.: 12/483,330

(22) Filed: Jun. 12, 2009

(65) Prior Publication Data

US 2009/0316295 A1    Dec. 24, 2009

(30) Foreign Application Priority Data

Jun. 19, 2008   (KR) ........................ 10-2008-0058018

(51) Int. Cl.
*G11B 21/02* (2006.01)
*G11B 5/596* (2006.01)
*G11B 5/09* (2006.01)

(52) U.S. Cl. ............ 360/75; 360/76; 360/48; 360/77.08
(58) Field of Classification Search .................. None
See application file for complete search history.

(56) References Cited

U.S. PATENT DOCUMENTS

| | | | |
|---|---|---|---|
| 5,790,341 A * | 8/1998 | Cunningham et al. .......... | 360/76 |
| 2004/0105186 A1 | 6/2004 | Yano | |
| 2008/0123209 A1 * | 5/2008 | Nakada et al. .................. | 360/48 |

FOREIGN PATENT DOCUMENTS

| | | |
|---|---|---|
| JP | 2001-189062 | 7/2001 |
| JP | 2006-009932 | 1/2006 |
| JP | 2007-122806 | 5/2007 |

\* cited by examiner

*Primary Examiner* — Andrew L Sniezek
(74) *Attorney, Agent, or Firm* — Stanzione & Kim, LLP

(57) ABSTRACT

A method of servo writing for each track of a magnetic recording medium divided into a plurality of circular tracks including performing a phase adjustment operation by controlling a phase of a recording current according to a skew angle formed by a magnetic head and a track of the magnetic recording medium, and writing a servo pattern when the magnetic recording medium is magnetized using a magnetic head so as to have a magnetized pattern corresponding to a servo pattern.

8 Claims, 6 Drawing Sheets

PREAMBLE PATTERN    ADDRESS PATTERN    BURST PATTERN

PREAMBLE PATTERN   ADDRESS PATTERN   BURST PATTERN

PREAMBLE PATTERN   ADDRESS PATTERN   BURST PATTERN

METHOD OF SERVO WRITING, METHOD OF COMPENSATING PHASE MISMATCH OF SERVO PATTERN AND HARD DISK DRIVE ON WHICH THE METHODS ARE IMPLEMENTED

CROSS-REFERENCE TO RELATED APPLICATIONS

This application claims priority under 35 U.S.C. §119(a) Korean Patent Application No. 10-2008-0058018, filed on Jun. 19, 2008, in the Korean Intellectual Property Office, the disclosure of which is incorporated herein in its entirety by reference.

BACKGROUND OF THE INVENTION

1. Field of the Invention

The present general inventive concept relates to a device and a method of writing servo information, and, more particularly a device and method of writing servo information to a magnetic recording medium for controlling a position of a magnetic head while a hard disk drive is driven.

2. Description of the Related Art

Hard disk drives (HDDs) that use magnetic recording media have a large recording capacity and a high access speed, and thus, they have received a large amount of attention for use as information memory apparatuses not only for computers but also for various other digital apparatuses. Recently, as industrialization has rapidly increased and information systems have become even more widely used, the amount of information exchanged over a variety of available networks has significantly increased. Thus, there is generally an ever present need for higher density HDDs to be developed and as such the recording density of magnetic recording media has continuously increased.

Servo information is typically written to a magnetic recording medium prior to use so that a magnetic head is correctly positioned at a desired position of the magnetic recording medium in order to drive a HDD. For this, a disk-shaped magnetic recording medium includes a data sector and a servo sector. The servo information required for seeking and following tracks is written to a servo sector in the shape of a servo pattern formed by magnetizing a recording layer of the magnetic recording medium to a predetermined pattern.

Meanwhile, as the recording density of magnetic recording mediums increase, the region occupied by the servo pattern typically needs to be decreased and thus the frequency of the servo pattern is generally increased. The servo writing is typically performed by a servo writing head in a head disk assembly. Here, the servo pattern may have a mismatch due to a skew generated by using a swing arm-shaped positioning apparatus. As the frequency of the servo pattern becomes higher, the effects of the mismatch on a position error signal are increased, and thus the mismatch may inhibit stable control of the servo sector.

SUMMARY OF THE INVENTION

Therefore, there is a need for a method of servo writing capable of decreasing mismatch of the servo pattern when using a servo pattern having a high frequency suitable for a magnetic recording medium having a high recording density.

The embodiments of the present general inventive concept provide a method of and a device for writing servo information which can form a servo pattern suitable for a magnetic recording medium having a high recording density.

Additional aspects and utilities of the present general inventive concept will be set forth in part in the description which follows and, in part, will be obvious from the description, or may be learned by practice of the general inventive concept.

The foregoing and/or other aspect and utilities of the general inventive concept may be achieved by providing a method of servo writing for each track of a magnetic recording medium divided into a plurality of circular tracks, the method including performing a phase adjustment operation by controlling a phase of a recording current according to a skew angle formed by a magnetic head and a track of the magnetic recording medium, and writing a servo pattern when the magnetic recording medium is magnetized using the magnetic head so as to have a magnetized pattern corresponding to a servo pattern.

The track may be divided into a plurality of subtracks having at least a first subtrack and a second subtrack, and sequentially performing servo writing on the plurality of subtracks, where the phase adjustment operation may be performed from the second subtrack of the plurality of subtracks.

The servo pattern may include a preamble pattern controlling an output level of a magnetic head, an address pattern comprising track identification information, and a burst pattern generating a position error signal required for following a track, where the phase adjustment operation is performed only when the burst pattern is written or when the preamble pattern, the address pattern, and the burst pattern are written.

The foregoing and/or other aspects and utilities of the general inventive concept may also be achieved by providing a method of compensating a phase mismatch of a servo pattern, including adjusting a phase of a recording current according to a skew angle formed by a magnetic head and a track of a magnetic recording medium when a servo pattern is written in the magnetic recording medium using a magnetic head.

The servo pattern may include a preamble pattern controlling an output level of a magnetic head, an address pattern comprising track identification information, and a burst pattern generating a position error signal required for following a track.

The method may include performing the phase adjustment operation only when the burst pattern is written, and compensating the output signal of the written preamble pattern according to a skew of the track during servo reading.

The foregoing and/or other aspects and utilities of the general inventive concept may also be achieved by providing a hard disk drive comprising a head disk assembly including a magnetic recording medium installed so as to rotate and a magnetic head writing to and reading from the magnetic recording medium, a driving unit to drive the magnetic head such that the magnetic head faces a predetermined track of the magnetic recording medium according to a control signal, a write/read channel to apply a servo write signal to the magnetic head or to process a servo read signal, a skew calculating unit to calculate a skew angle of a track which the magnetic head faces, and a controlling unit to delay the phase of the servo write signal in the write/read channel according to a phase delay value corresponding to the skew angle.

The foregoing and/or other aspects and utilities of the general inventive concept may also be achieved by providing a method of compensating phase mismatch of a servo pattern, including predicting a phase mismatch according to a skew angle, which is the degree of inclination of a magnetic head with respect to a track line on a magnetic recording medium, and adjusting a phase of a recording current according to the predicted phase mismatch to minimize the phase mismatch.

The adjusting the phase of the method may include calculating a phase adjustment angle using at least the skew angle, a linear velocity of a track on the magnetic recording medium, and a recording frequency.

The adjusting the phase of the recording current may include advancing or delaying the phase of the recording current by the calculated phase adjustment angle.

The foregoing and/or other aspects and utilities of the general inventive concept may also be achieved by providing a method of servo writing for each track of a magnetic recording medium divided into a plurality of circular tracks, the method including predicting a phase mismatch according to a skew angle formed by a magnetic head and a track of the magnetic recording, performing a phase adjustment operation by controlling a phase of a recording current according to the predicted phase mismatch, and writing a servo pattern when the magnetic recording medium is magnetized using the magnetic head so as to have a magnetized pattern corresponding to a servo pattern.

The foregoing and/or other aspects and utilities of the general inventive concept may also be achieved by providing an electronic apparatus, having a hard disk including a head disk assembly having a magnetic recording medium installed so as to rotate and a magnetic head writing to and reading from the magnetic recording medium, a driving unit to drive the magnetic head such that the magnetic head faces a predetermined track of the magnetic recording medium according to a control signal, a write/read channel to apply a servo write signal to the magnetic head or to process a servo read signal, a skew calculating unit to calculate a skew angle of a track which the magnetic head faces, and a controlling unit to delay the phase of the servo write signal in the write/read channel according to a phase delay value corresponding to the skew angle.

The electronic apparatus may further includes a function unit communicatively coupled to the hard disk to perform at least one predetermined operation, wherein the function unit requests data to be retrieved from and data to be stored on the hard disk in connection with the performed predetermined operation.

BRIEF DESCRIPTION OF THE DRAWINGS

These and/or other aspects and utilities of the present general inventive concept will become apparent and more readily appreciated from the following description of the embodiments, taken in conjunction with the accompanying drawings of which.

DETAILED DESCRIPTION OF THE PREFERRED EMBODIMENTS

Figure 1:
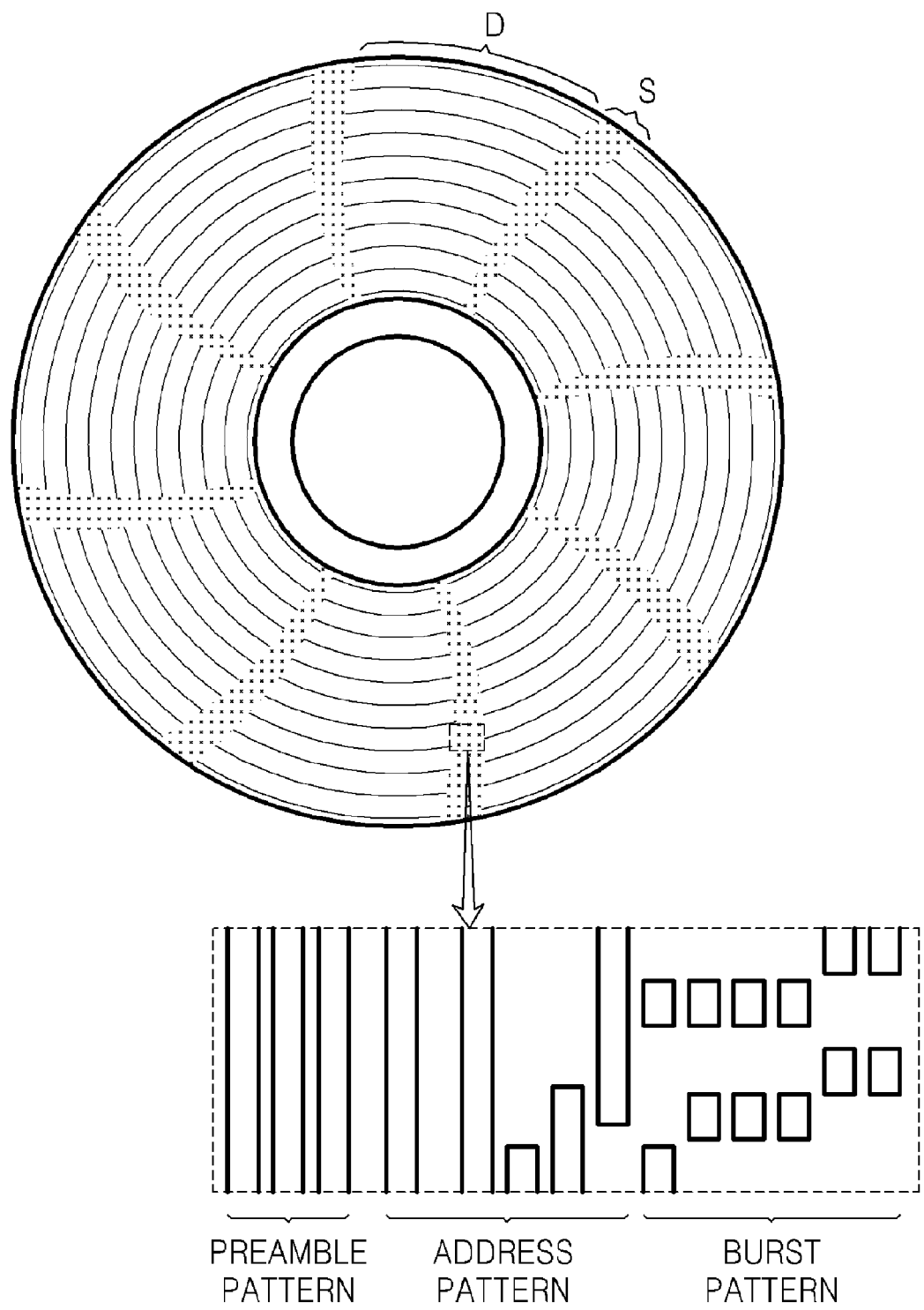
FIG. 1 illustrates a typical structure of a magnetic recording medium.

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the figures.

Types and functions of servo patterns formed in a servo sector of a magnetic recording medium will be briefly described prior to describing a method of servo writing and a method of compensating a phase mismatch of a servo pattern according to the present general inventive concept.

FIG. 1 illustrates a typical structure of a magnetic recording medium.

Referring to FIG. 1, the magnetic recording medium has a disk shape for information to be recorded thereto along a plurality of circular tracks. The circular tracks are divided into a data sector D to which data is recorded and a servo sector S to which servo information is recorded. A servo pattern is formed in the servo sector S by magnetizing the servo sector S to a specific pattern.

The servo pattern includes, for example, a preamble pattern, an address pattern, and a burst pattern. The preamble pattern controls an output level of a magnetic head used to read the burst pattern. A position error signal (PES) is generated from an output level of the burst pattern based on the controlled output level of the magnetic head. The address pattern provides information used to identify tracks and may include a servo address mark (SAM) signaling the beginning of the servo sector and then providing synchronization for reading a gray code subsequent to the SAM, and a gray code providing a track identification (ID). The burst pattern generates a PES in order to detect a position in the track. The PES indicates a position error of the magnetic head with respect to the center of the track. Based on the PES, an actuator arm on which the magnetic head is mounted is controlled when the track is followed.

The illustrated patterns are only examples and therefore the forms of the patterns vary according to the track. When a HDD writes to and reads from the magnetic recording medium, servo information is read from the servo pattern formed in the servo sector S to perform seeking and following of tracks.

Figure 2:
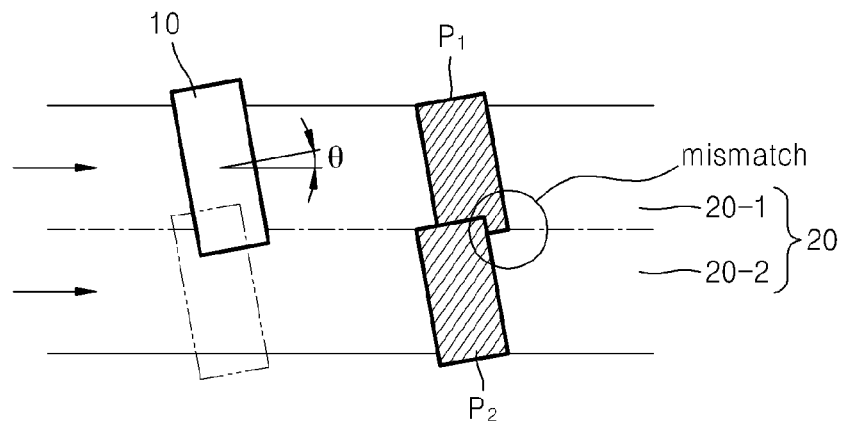
FIG. 2 illustrates a mismatch occurred while a servo pattern is written.
Figure 3:
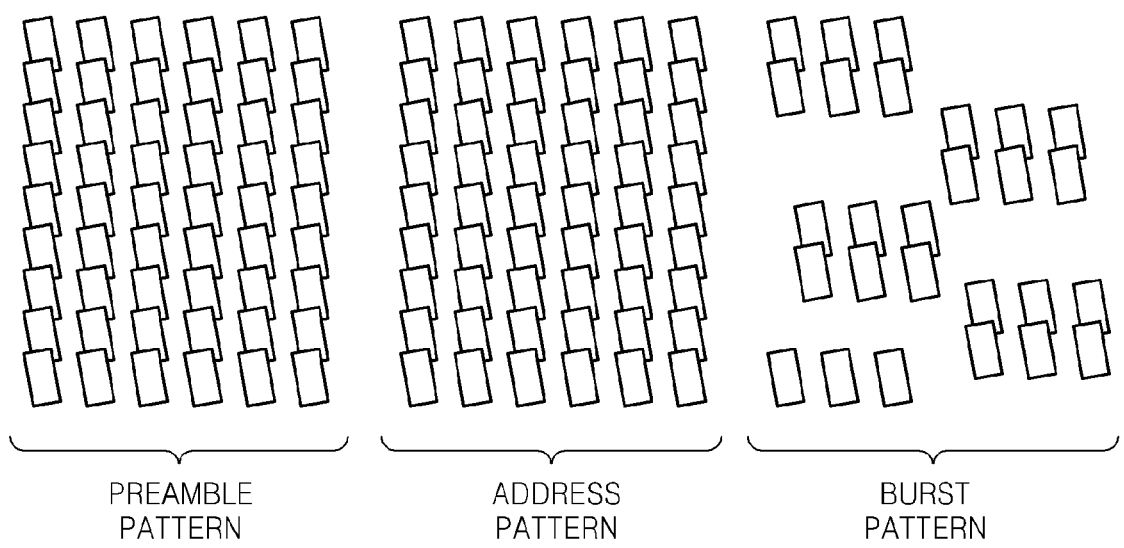
FIG. 3 illustrates a typical servo pattern having a phase mismatch according to a skew.

FIG. 2 illustrates a mismatch occurring while a servo pattern is written. FIG. 3 illustrates a typical servo pattern having a phase mismatch.

The magnetic head 10 magnetizes a track 20 into a predetermined pattern to write the servo pattern in the same manner as when writing data. Referring to FIG. 2, the magnetic head 10 is inclined with respect to a track line. The magnetic head is inevitably inclined since the position of the magnetic head 10 with respect to the magnetic recording medium is determined using a swing arm-shaped positioning apparatus during the servo writing. The degree of the inclination of the magnetic head 10 with respect to the track line may be represented as a skew angle θ. The magnetic head 10 includes a writing head and a reading head. FIG. 2 only illustrates a cross section of a pole tip of the writing head which faces the magnetic recording medium. The central line of the magnetic head 10 which defines the skew angle is the line connecting centers of the writing head and the reading head. The magnetic head 10 does not form the servo pattern in a width of one track at a time, but in widths of ½ track or ⅓ track to write the servo pattern. In the case illustrated in FIG. 2, the magnetic head 10 forms the servo pattern moving in widths of ½ track. That is, the magnetic head writes a servo pattern P1 on a first subtrack 20-1, moves a half track, and writes a servo pattern P2 on a second subtrack 20-2. Here, due to the skew angle of the magnetic head 10, a phase mismatch occurs between the servo pattern P1 formed on the first subtrack 20-1 and the servo pattern P2 formed on the second subtrack 20-2. Thus, a servo pattern having a phase mismatch illustrated in FIG. 3 is formed.

Figure 4:
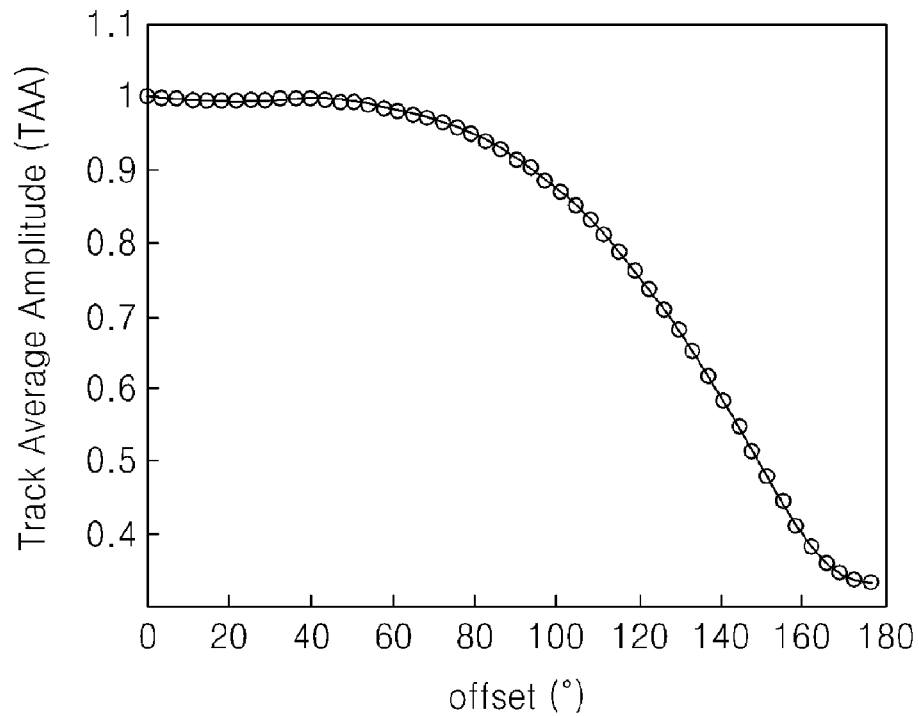
FIG. 4 is a graph of illustrating decrease of output signals with respect to a phase mismatch.

FIG. 4 is a graph of illustrating decrease of output signals with respect to a phase mismatch. The horizontal axis of the graph represents a phase mismatch as a mismatched offset angle assuming that a cycle of the servo pattern is 360 degrees. The vertical axis of the graph represents a track average amplitude (TAA). Referring to the graph, if the offset angle is about greater than 40 degrees, an output signal is rapidly decreased. Since the graph is a simulation graph obtained under ideal conditions, in practice it is reported that the graph of the output signal is actually steeper. In particular, the output signal decreases more rapidly as the frequency of the servo pattern is increased in line with the increase of the recording density. The decrease of the output signal due to the servo pattern may inhibit accurate tracking. For example, the PES may be measured lower than the real value even though the degree of off-track is increased.

According to an embodiment of the present general inventive concept discussed below, the phase mismatch which may occur according to the skew angle can be predicted. Accordingly, the phase of the recording current can be adjusted, and thus the phase mismatch can be minimized.

Figure 5:
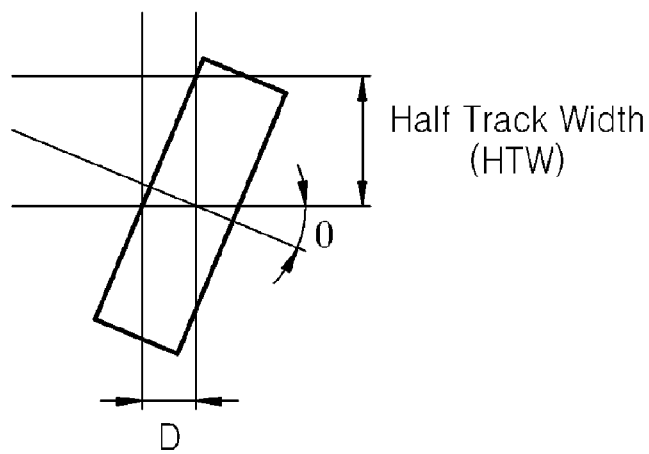
FIG. 5 illustrates a phase adjustment angle in servo writing according to an embodiment of the present general inventive concept.

FIG. 5 is a diagram illustrating a phase adjustment angle in servo writing according to an embodiment of the present general inventive concept. For example, when the servo pattern is written by moving a magnetic head in width of half track, a phase mismatch D of the servo pattern between a first half track and a second half track may be calculated according to a half track width (HTW) and a skew angle (θ). Accordingly, a phase angle Φ may be calculated as follows using Equation 1 below.

$$\Phi = v/(2\pi f)*HTW \sin \theta \quad \text{Equation 1}$$

Here, v is a linear velocity of a track while a disk is rotated, and f is a recording frequency. Since the phase angle can be calculated as described above, the phase mismatch of the servo pattern may be reduced by advancing or delaying the phase of the recording current by the phase angle when the servo pattern is written on the second half track. Here, the meaning of the advancing or delaying the phase of the recording current will be described in more detail. The value and direction of the skew angle θ which represents the degree of inclination of the magnetic head with respect to the track line vary according to the track. For example, even if the magnetic head is inclined θ degree clockwise from the track line in FIG. 5, the magnetic head may be inclined θ degree counterclockwise from another track line. If the skew angle θ has a positive value, the phase angle Φ may also have a positive angle according to Equation 1. This indicates that the phase angle is delayed by the value, and thus the phase of the recording current is advanced by the same value when the servo pattern is written on the second half track. In addition, if the skew angle θ has a negative value, the phase angle Φ may also have a negative value according to Equation 1. Thus, the phase of the recording current is delayed by the same value when the servo pattern is written on the second half track.

If the track is divided into more than two subtracks, phase angles may be calculated in the same manner as described above, the phase angle of the recording current is adjusted from the second subtrack when the servo pattern is formed.

Figure 6:
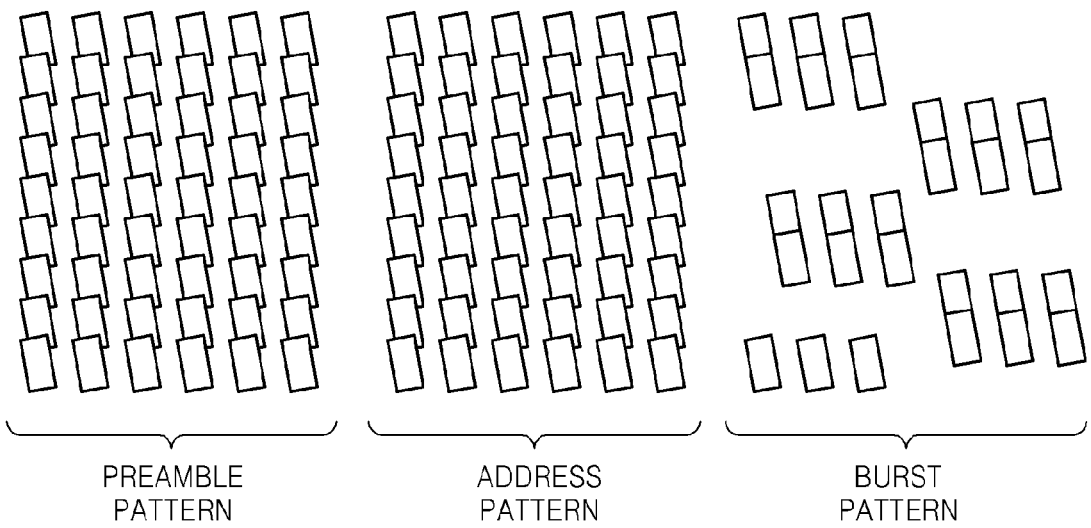
FIG. 6 illustrates a servo pattern written according to a method of servo writing according to an embodiment of the present general inventive concept.

FIG. 6 illustrates a servo pattern written using a method of servo writing according to an embodiment of the present general inventive concept. The shape of the servo pattern illustrated in FIG. 6 may be obtained by performing the above-described phase adjustment operation only when the burst pattern is written. Thus, the burst pattern is formed having no phase mismatch.

Meanwhile, there is a need to compensate for the phase mismatch formed in the preamble pattern during the servo reading when the servo pattern is formed according to the above-described process. Since the output level of the magnetic head for reading the burst pattern is controlled by the output signal of the preamble pattern, if the output signal of the preamble pattern is decreased, the PES may be measured lower than the real value even though the degree of off-track is increased. Therefore, the output level of the magnetic head for reading the burst pattern may be controlled in consideration of the decrease of the output signal according to the phase mismatch due to the skew angle during the servo reading.

Figure 7:
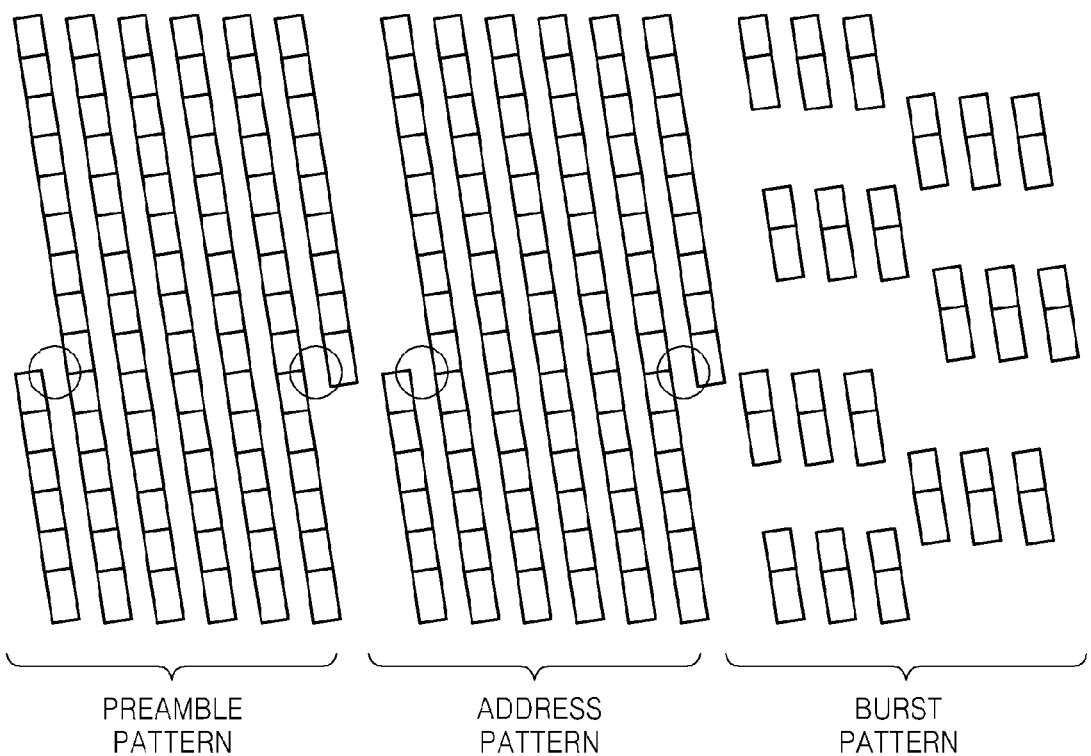
FIG. 7 illustrates a servo pattern written according to a method of servo writing according to another embodiment of the present general inventive concept.

FIG. 7 illustrates a servo pattern written using a method of servo writing according to another embodiment of the present general inventive concept. The shape of the servo pattern illustrated in FIG. 7 is obtained by performing the above-describe phase adjustment operation when the preamble pattern, the address pattern, and the burst pattern are written. For example, this operation may be performed when all of the preamble pattern, the address pattern, and burst pattern are written.

The preamble pattern, the address pattern, and the burst pattern having no phase mismatch are formed. As illustrated in FIG. 7, discontinuous servo patterns identified by circles are formed when the phase adjustment operation is performed by dividing the tracks into sections. That is, a plurality of phase adjustment sections, each of which includes a plurality of tracks are set and the phase of the recording current is sequentially adjusted in each of the phase adjustment sections such that a servo pattern having no phase mismatch with a servo pattern written in a previous subtrack is formed. The phase of the recording current may be adjusted in order to not have any discontinuous servo patterns in the entire track.

Meanwhile, if the servo pattern as illustrated in FIG. 7 is written, the output signal of the discontinuous points may be compensated for in the servo reading process since the output signal change of the preamble pattern may cause an error when the PES is generated based on the burst pattern as described above. Thus, the output level of the magnetic head reading the burst pattern is adjusted in consideration of the output signal change due to the discontinuous preamble pattern in the track of the boundary between the phase adjustment sections.

Figure 8:
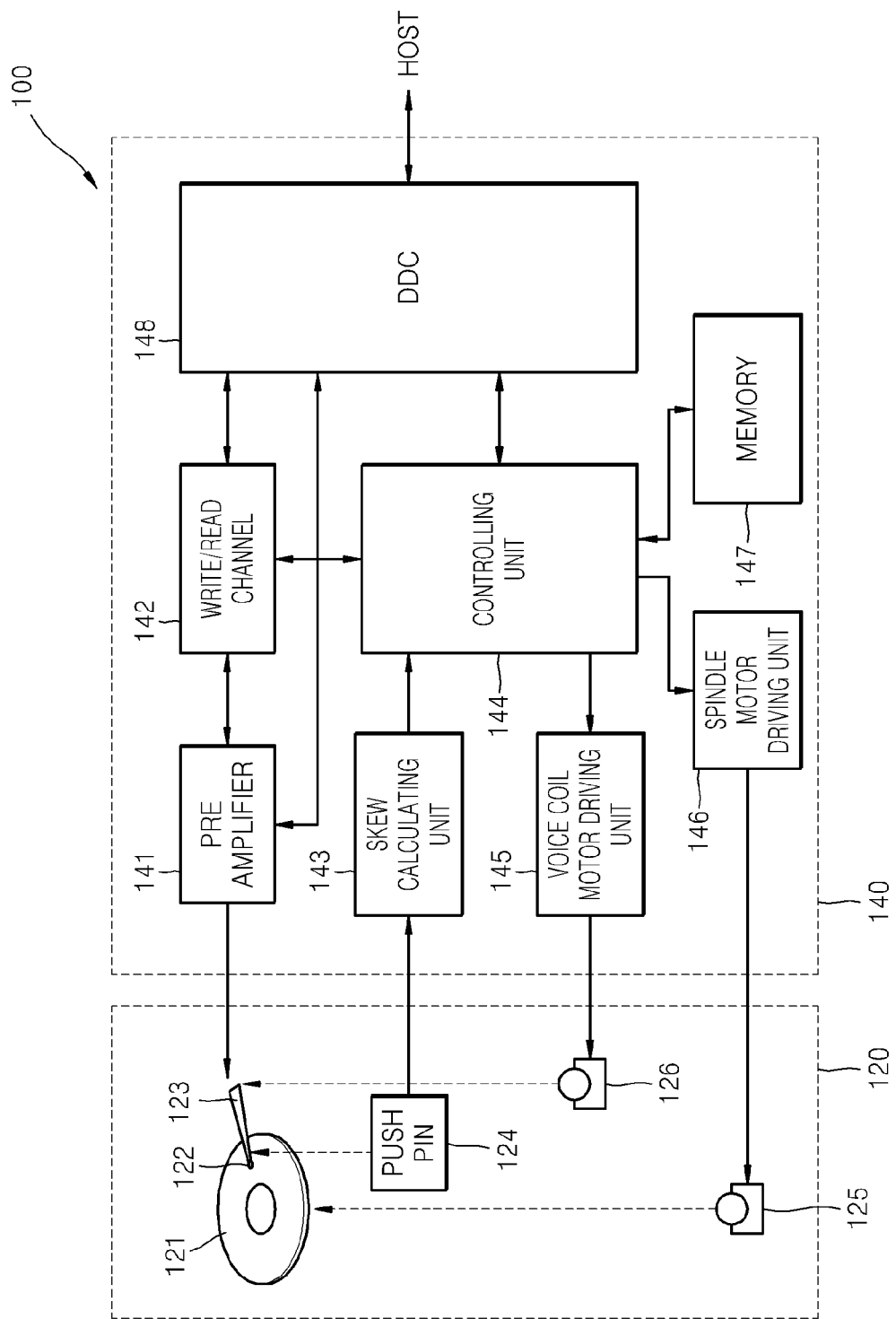
FIG. 8 illustrates a block diagram of a HDD performing a method of servo writing and a method of compensating a phase mismatch of a servo pattern according to an embodiment of the present general inventive concept.

FIG. 8 illustrates a block diagram of a HDD performing a method of servo writing and a method of compensating phase mismatch of a servo pattern according to an embodiment of the present general inventive concept. Referring to FIG. 8, a HDD 100 includes a head disk assembly 120 and a circuit unit 140.

The head disk assembly 120 includes a magnetic recording medium 121 installed so as to rotate, and a magnetic head 122 to write to and to read from the magnetic recording medium 121. The circuit unit 140 includes a driving unit 145 to drive the magnetic head 122 such that the magnetic head 122 faces a predetermined track of the magnetic recording medium according to a control signal, a write/read channel 142 to apply a servo write signal to the magnetic head 122 or processes a servo read signal, a skew calculating unit 143 to calculate a skew angle of a track which the magnetic head 122 faces, and a controlling unit 144 to delay the phase of the servo write signal in the write/read channel 142 according to a phase delay value corresponding to the skew angle.

In more particular, the head disk assembly 120 includes a magnetic recording medium 121 installed so as to rotate by a spindle motor 125 and an actuator 123 to be driven by a voice coil motor (VCM) 126. A slider having the magnetic head 122 is installed at one end of the actuator 123. The head disk assembly 120 further includes a push pin 124 to detect the position of the magnetic head 122 so that the skew angle of the track which the magnetic head 122 faces can be calculated.

The circuit unit 140 includes a pre amplifier 141, a write/read channel 142, a controlling unit 144, a voice coil motor driving unit 145, a spindle motor driving unit 146, a disk data controller (DDC) 148, and a memory 147.

When data is recorded, coded recording data, which is applied from the write/read channel 142, is recorded via the magnetic head 122 onto the magnetic recording medium 121 by the pre amplifier 141. When data is reproduced, the preamplifier 141 applies an analog read signal, which is formed by amplifying a signal picked up from the magnetic head 122, to the write/read channel 142.

The write/read channel 142 applies a write signal or processes a read signal. For example, the write/read channel 142 may apply write signals that form a servo pattern such as the preamble pattern, the address pattern, and/or the burst pattern during the servo writing. The write/read channel 142 may apply a write signal in which the phase is controlled according to the control signal of the controlling unit 144. In addition, the write/read channel 142 may determine an output level of the magnetic head 122 by compensating output signals of the preamble pattern during the servo reading and generates a PES based on the burst pattern. For example, when a servo pattern such as those illustrated FIG. 6 or 7 is read, the write/read channel 142 determines the output level for reading the burst pattern in consideration of phase mismatch of the preamble pattern or the output signal change due to discontinuation, and generates a PES based on the burst pattern.

The controlling unit 144 calculates a phase delay value based on the skew angle of the position of the track which the magnetic head 122 faces and controls the write/read channel 142 to delay phase of the servo write signal. The controlling unit 144 may include a phase delay calculator, a delay counter, or the like. In addition, the controlling unit 144 may control the voice coil motor driving unit 145 such that the magnetic head 122 can accurately follow tracks on the magnetic recording medium 121 according to the PES while data is written or read.

The DDC 148 may be a communication interface between a host computer and the controlling unit 144. The memory 147 stores operating programs and a variety of settings of the controlling unit 144. For example, data to be written is applied from the host to the DDC 148 and written in the magnetic recording medium 121 via the write/read channel 142 and the pre amplifier 141. The controlling unit 144 applies a control signal to the voice coil motor driving unit 145 according to a program stored in the memory 147.

Figure 9:
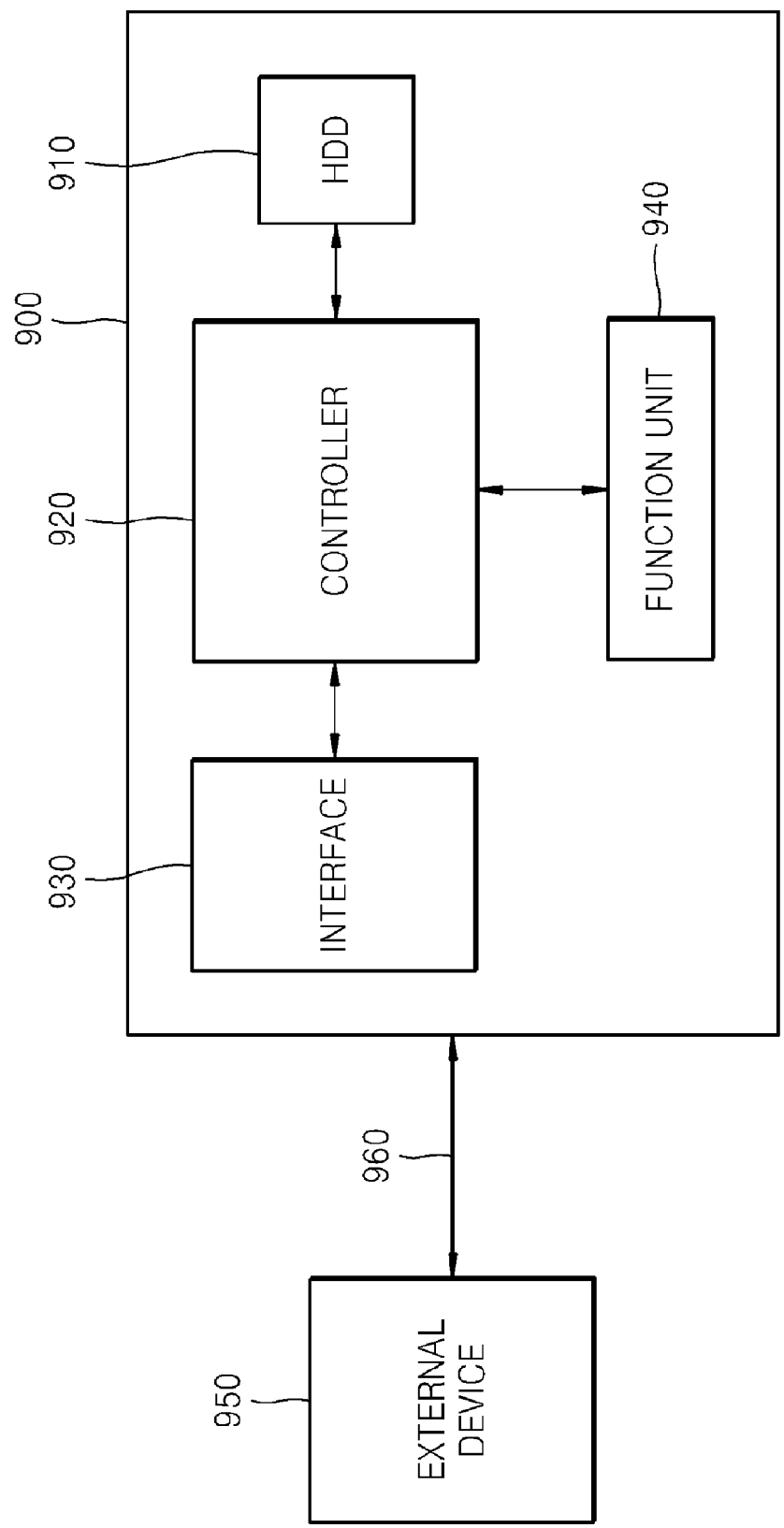
FIG. 9 illustrates a block diagram of an electronic apparatus including a HDD performing a method of servo writing and a method of compensating a phase mismatch of a servo pattern according to an embodiment of the present general inventive concept.

FIG. 9 illustrates a block diagram of an electronic apparatus 900 including a HDD 910 performing a method of servo writing and a method of compensating a phase mismatch of a servo pattern according to an embodiment of the present general inventive concept. As illustrated in FIG. 9, an external device 950 may send or receive data, or may request data, from the electronic apparatus 900 via a communications link 960. The communications link 960 may be any suitable wired or wireless communication link or network to exchange data between the external device 950 and the electronic apparatus 900. The electronic apparatus 900 may transmit and receive data to the external device 950 via the interface 930. The interface 930 may be any suitable analog and/or digital interface to send and/or receive data between the interface 930 and a controller 920, as well as to send and/or receive data communications with the external device 950.

Controller 920 of the electronic apparatus 900 may send read and/or write signals to HDD 910 so as to read and/or write data, and may also control the operation of a function unit 960. The controller 920 may control the HDD 910 or the function unit 940 based at least in part on the data received from the external device 950. The function unit 940 may be, for example, an apparatus to perform image processing, image forming, data processing, movement of an apparatus of which the electronic apparatus 900 is a part of, a music device, a navigation device, a telecommunications device, any combination thereof, or any other suitable device. The function unit 940 may request that the HDD 910 retrieve data and write data during the performance of various operations executed by the function unit 940. The HDD 910 may perform a method of servo writing and a method of compensating a phase mismatch of a servo pattern at least the same manner as described by the embodiments of the present general inventive concept discussed above.

As described above, the embodiment of the present general inventive concept provides a method of servo writing which reduces a phase mismatch of a servo pattern making the servo control unstable by adjusting a phase of recording current by converting the mismatch distance due to a skew angle into a phase angle. In addition, the phase mismatch can be compensated for by performing a phase adjustment operation only when the burst pattern is written and compensating the output of the preamble pattern during the servo reading. Therefore, according to the embodiment of the present general inventive concept, stable servo characteristics can be obtained even when a high density servo pattern having increased mismatch distance due to the skew is formed.

While the method of servo writing, the method of compensating phase mismatch of a servo pattern, and a hard disk drive for implementing the methods have been particularly illustrated and described with reference to exemplary embodiments thereof, it will be understood by those of ordinary skill in the art that various changes in form and details may be made therein without departing from the spirit and scope of the present general inventive concept as defined by the following claims.

The present general inventive concept can also be embodied as computer-readable codes on a computer-readable medium. The computer-readable medium can include a computer-readable recording medium and a computer-readable transmission medium. The computer-readable recording medium is any data storage device that can store data as a program which can be thereafter read by a computer system. Examples of the computer-readable recording medium include read-only memory (ROM), random-access memory (RAM), CD-ROMs, magnetic tapes, floppy disks, and optical data storage devices. The computer-readable recording medium can also be distributed over network coupled computer systems so that the computer-readable code is stored and executed in a distributed fashion. Also, functional programs, codes, and code segments to accomplish the present general inventive concept can be easily construed by programmers skilled in the art to which the present general inventive concept pertains.

Although a few embodiments of the present general inventive concept have been illustrated and described, it will be appreciated by those skilled in the art that changes may be made in these embodiments without departing from the principles and spirit of the general inventive concept, the scope of which is defined in the appended claims and their equivalents.

What is claimed is:

1. A method of servo writing for each track of a magnetic recording medium divided into a plurality of circular tracks, the method comprising:
performing a phase adjustment operation by controlling a phase of a recording current according to a skew angle formed by a magnetic head and a track of the magnetic recording medium; and
writing a servo pattern when the magnetic recording medium is magnetized using the magnetic head so as to have a magnetized pattern corresponding to a servo pattern,
wherein writing the servo pattern comprises:
writing a preamble pattern to control an output level of a magnetic head,
writing an address pattern having track identification information, and
writing a burst pattern to generate a position error signal for following a track;
performing the phase adjustment operation only when the burst pattern is written; and
compensating the output signal of the written preamble pattern according to a skew of the track during servo reading.

2. The method of claim 1, further comprising:
dividing the track into a plurality of subtracks having at least a first subtrack and a second subtrack; and
sequentially performing servo writing on the plurality of subtracks,
wherein the phase adjustment operation is performed from the second subtrack of the plurality of subtracks.

3. The method of claim 2, further comprising:
delaying or advancing a phase of a recording current when the second subtrack is written so that a phase mismatch between a pattern formed on the first subtrack and a pattern formed on the second subtrack is offset.

4. A method of compensating a phase mismatch of a servo pattern, comprising:
adjusting a phase of a recording current according to a skew angle formed by a magnetic head and a track of a magnetic recording medium when a servo pattern is written in a magnetic recording medium using a magnetic head,
wherein writing the servo pattern comprises:
writing a preamble pattern to control an output level of a magnetic head,
writing an address pattern having track identification information, and
writing a burst pattern to generate a position error signal required for following a track;
performing the phase adjustment operation only when the burst pattern is written; and
compensating the output signal of the written preamble pattern according to a skew of the track during servo reading.

5. A method of compensating a phase mismatch of a servo pattern, comprising:
adjusting a phase of a recording current according to a skew angle formed by a magnetic head and a track of a magnetic recording medium when a servo pattern is written in a magnetic recoding medium using a magnetic head,
wherein writing the servo pattern comprises:
writing a preamble pattern to control an output level of a magnetic head,
writing an address pattern having track identification information, and
writing a burst pattern to generate a position error signal required for following a track;
wherein the adjusting the phase is performed when the preamble pattern, the address pattern, and the burst pattern are written;
setting a plurality of phase adjustment sections, wherein a single phase adjustment section comprises a plurality of tracks;
sequentially performing the phase adjustment operation in each of the phase adjustment sections; and
compensating the output signal of the preamble pattern in the track of the boundary between the phase adjustment sections during servo reading.

6. A hard disk drive comprising:
a head disk assembly having a magnetic recording medium installed so as to rotate and a magnetic head writing to and reading from the magnetic recording medium;
a driving unit to drive the magnetic head such that the magnetic head faces a predetermined track of the magnetic recording medium according to a control signal;
a write/read channel to apply a servo write signal to the magnetic head or to process a servo read signal;
a skew calculating unit to calculate a skew angle of a track which the magnetic head faces; and
a controlling unit to delay the phase of the servo write signal in the write/read channel according to a phase delay value corresponding to the skew angle,
wherein the servo write signal for the magnetic recording medium comprises:
a preamble pattern to control an output level of a magnetic head,
an address pattern having track identification information, and
a burst pattern to generate a position error signal for following a track,
wherein the controlling unit controls the servo write signal to delay the phase of the servo write signal only when the burst pattern is written,
wherein the write/read channel is to compensate the output signal of the preamble pattern according to the skew of the track to set the output level of the magnetic head, and is to generate the position error signal based on the burst pattern.

7. An electronic apparatus, comprising:
a hard disk having:
a head disk assembly having a magnetic recording medium installed so as to rotate and a magnetic head writing to and reading from the magnetic recording medium;
a driving unit to drive the magnetic head such that the magnetic head faces a predetermined track of the magnetic recording medium according to a control signal;
a write/read channel to apply a servo write signal to the magnetic head or to process a servo read signal;
a skew calculating unit to calculate a skew angle of a track which the magnetic head faces; and a controlling unit to delay the phase of the servo write signal in the write/read channel according to a phase delay value corresponding to the skew angle, wherein the servo write signal for the magnetic recording medium comprises:
- a preamble pattern to control an output level of a magnetic head,
- an address pattern having track identification information, and
- a burst pattern to generate a position error signal for following a track;

wherein the controlling unit controls the servo write signal to delay the phase of the servo write signal only when the burst pattern is written, wherein the write/read channel is to compensate the output signal of the preamble pattern according to the skew of the track to set the output level of the magnetic head, and is to generate the position error signal based on the burst pattern.

8. The electronic apparatus of claim 7, further comprising:
a function unit communicatively coupled to the hard disk to perform at least one predetermined operation, wherein the function unit requests data to be retrieved from and data to be stored on the hard disk in connection with the performed predetermined operation.

* * * * *